(12) United States Patent
Hara et al.

(10) Patent No.: US 6,999,061 B2
(45) Date of Patent: Feb. 14, 2006

(54) ELECTRONIC WHITEBOARD SYSTEM

(75) Inventors: Naozumi Hara, Fukuoka (JP); Kazuhiro Eguchi, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 107 days.

(21) Appl. No.: 10/234,871

(22) Filed: Sep. 3, 2002

(65) Prior Publication Data

US 2003/0058227 A1    Mar. 27, 2003

(30) Foreign Application Priority Data

Sep. 5, 2001    (JP)    ............... P. 2001-268475

(51) Int. Cl.
G09G 5/08    (2006.01)

(52) U.S. Cl. ............ 345/157; 345/158; 345/173; 345/629; 178/18.01

(58) Field of Classification Search ........ 345/156–158, 345/173–179, 443, 763, 769, 180, 629; 178/18.01, 178/18.03, 18.04
See application file for complete search history.

(56) References Cited

U.S. PATENT DOCUMENTS

| | | | | |
|---|---|---|---|---|
| 5,289,566 A | * | 2/1994 | Walker et al. | 345/592 |
| 5,412,402 A | * | 5/1995 | Searby et al. | 345/639 |
| 5,528,263 A | * | 6/1996 | Platzker et al. | 345/156 |
| 5,636,337 A | * | 6/1997 | Boenke et al. | 345/629 |
| 5,790,114 A | * | 8/1998 | Geaghan et al. | 345/763 |
| 5,867,159 A | * | 2/1999 | Hamada et al. | 345/443 |
| 5,949,432 A | * | 9/1999 | Gough et al. | 345/629 |
| 6,014,140 A | * | 1/2000 | Strand | 345/684 |
| 6,100,538 A | * | 8/2000 | Ogawa | 250/559.29 |
| 6,100,877 A |   | 8/2000 | Chery et al. | |
| 6,104,387 A |   | 8/2000 | Chery et al. | |
| 6,191,778 B1 |   | 2/2001 | Chery et al. | |
| 6,434,269 B1 | * | 8/2002 | Hamburg | 382/163 |
| 6,507,342 B1 | * | 1/2003 | Hirayama | 345/440 |
| 6,529,217 B1 | * | 3/2003 | Maguire et al. | 345/769 |

FOREIGN PATENT DOCUMENTS

GB    2 340 712 A    2/2000

* cited by examiner

Primary Examiner—Alexander Eisen
Assistant Examiner—Kimnhung Nguyen
(74) Attorney, Agent, or Firm—Pearne & Gordon LLP

(57)    ABSTRACT

Electronic whiteboard system comprises projected position information setting means for setting projected position information of a PC screen image projected onto the screen of the electronic whiteboard, projected position information storage section for storing projected position information, desktop operation/drawing means for enabling operation on the PC screen image projected on the screen by using an electronic pin as well as storing the locus of free lines drawn on the PC screen image in correspondence with the base image of the PC screen, document information storage section for storing a pair of base image and free lines on a per page basis and storing a plurality of pages as document information, and document information regeneration means for displaying a base image on the window of a computer unit then free lines over the base image in the order the lines were drawn based on the document information stored in the document information storage section.

11 Claims, 7 Drawing Sheets

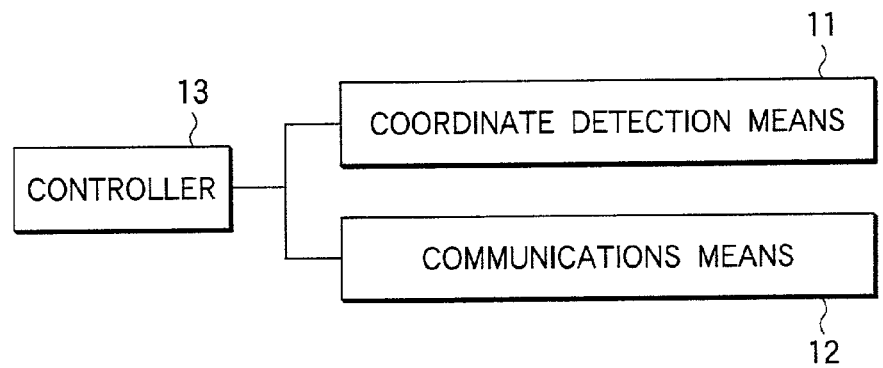
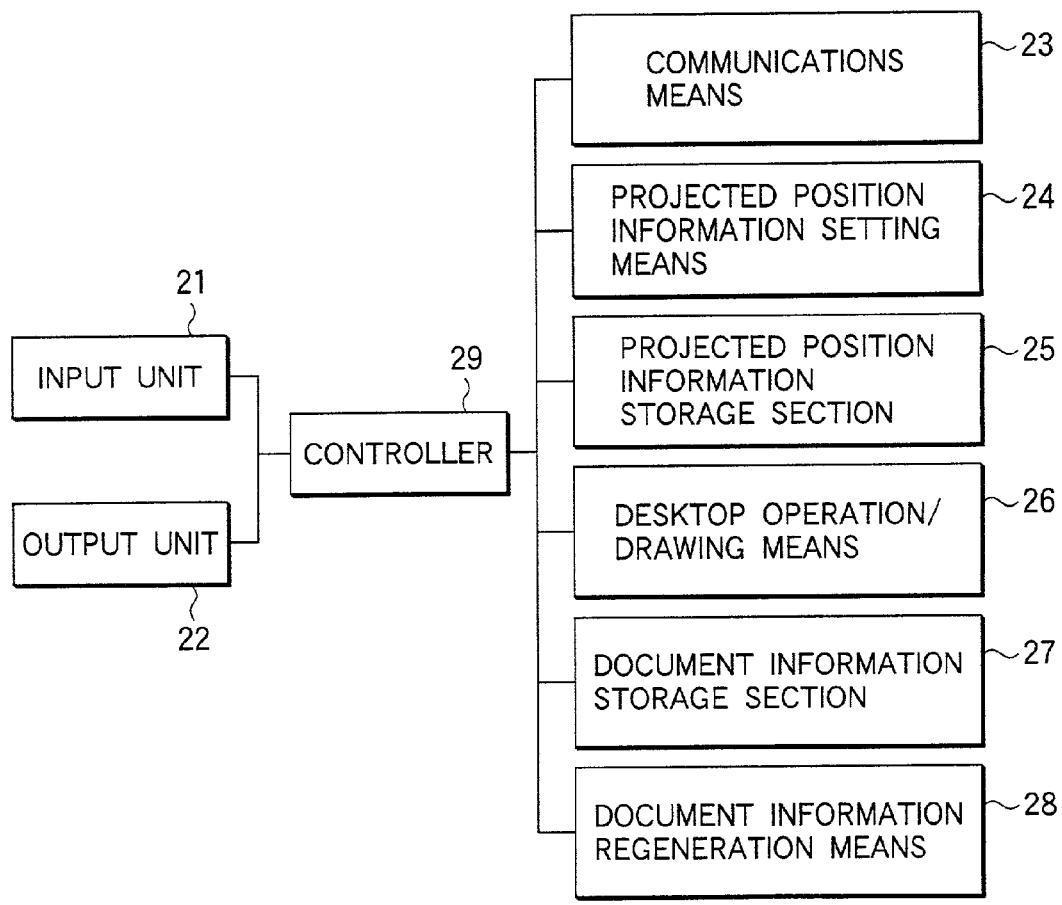

ELECTRONIC WHITEBOARD SYSTEM

BACKGROUND OF THE INVENTION

The present invention relates to an electronic whiteboard, and in particular to an electronic whiteboard system where the image of a PC screen projected onto a screen of the electronic whiteboard can be operated with a pen.

In recent years, an electronic whiteboard system is known incorporating a so-called interactive feature which uses a coordinate detection technology to automatically detect an operating position of an electronic whiteboard on a screen by using a sensor to project the screen of a computer unit such as a PC on the electronic whiteboard screen with a projector, so as to operate the image of the PC screen on the electronic whiteboard screen.

At the same time, by using software on a PC having a feature for directly drawing free lines on the image of a PC screen, it is possible to make an effective presentation.

Operation of a related art electronic whiteboard will be described referring to FIGS. 10, 11 and 12.

FIG. 10 is an explanatory drawing of a related art electronic whiteboard system, FIG. 11 an explanatory drawing showing the projected position information in the electronic whiteboard system in FIG. 10, FIG. 12 an explanatory drawing showing a drawing tool of software on the PC in the electronic whiteboard system in FIG. 10.

As shown in FIG. 10, in a related art electronic whiteboard system, an electronic whiteboard 101 and a PC (computer unit) 102 are interconnected via a communications cable 103a. A projector 104 for projecting the image of a screen 105 of a PC 102 onto a screen 111 the electronic whiteboard 101 and the PC 102 are interconnected via a communications cable 103b. Also provided are an electronic pen 107 for writing predetermined data onto the screen 111 where the image of the PC screen 105 is projected and coordinate detection sensors 106 arranged in two upper corners of the screen for detecting a coordinate position as a write position of the electronic pen 107 on the screen 111.

A coordinate detection technology required for an interactive feature in such an electronic whiteboard system will be described.

Infrared rays and a supersonic wave simultaneously issued from the electronic pen 107 are received by the coordinate detection sensor 106 and its time difference is used to calculate the distance from the electronic pen 107 to the coordinate detection sensor 106. That is, the distance between the two coordinate detection sensors 106 arranged in two upper corners of the screen 111 is known and a coordinate is detected via the trigonometry.

While coordinate detection on the screen 111 is made using the electronic pen 107 and the coordinate detection sensor 106, other coordinate detection technology such as a touch-panel system may be used. While the electronic whiteboard 101 and the PC 102, and the PC 102 and the projector 104 are connected by wires using communications cables 103a, 103b, radio communications may be used instead.

Coordinate information detected is sequentially sent to the PC 102 via the communications cable 103a. The PC 102 converts a coordinate assuming the upper left corner of the screen 111 to the coordinate system of the screen 105 of the PC 102, based on the received coordinate information.

The image of the screen 105 of the PC 102 is projected in an arbitrary position of the screen 111, so that it is necessary to know the projection position in advance. This is made possible by specifying the four corners of the image of the screen 105 on the screen 111 once when the projection position of the image of the screen 105 on the screen 111 is determined.

A range of the screen 111 shown in FIG. 11 is a projection area 112 of the image of a screen 105.

With the operation of specifying the four corners, the values of left, top, width, height are determined and stored. By associating a position where the electronic pen 107 is operated on the screen 111 to a position in the coordinate system of the PC 102, mouse event information can be generated in this position by way of software. This makes it possible to operate, on the screen 111, the image of the screen 105 of the PC 102 projected onto the screen 111.

When an arrow 121 is selected in the first drawing tool shown in FIG. 12, an ordinary mouse operation is allowed on the screen 111. When a pen 122 is selected, operating an electronic pen 107 on the image of the screen 105 of the screen 111 draws free lines on the image of the screen 105 to then locus of the operation. When an eraser 123 is selected, the same operation erases the free lines drawn with the pen 122. Pen Setting 124 is a button for changing the size and color of the pen 122. When Pen Setting 124 is selected, the size and color of the pen 122 is set for example by displaying a dialog box. Once setting is made, free lines are drawn with the pen 122 in specified size and color.

According to the electronic whiteboard system, it is possible to make an effective presentation by entering annotation in a necessary material with the pen 122 by using this system, with the image of the screen 105 of the PC 102 projected onto the screen of the electronic whiteboard 101.

In a related art electronic whiteboard system of the aforementioned configuration, a capture image of the screen 105 of the PC 102 where free lines are drawn is acquired as required and filed for storage as minutes of the proceedings.

However, the filed image is a still image obtained when capture of the screen 105 is specified and the stroke of the locus of the free lines therein cannot be referenced.

SUMMARY OF THE INVENTION

The invention thus aims at providing an electronic whiteboard system which can reproduce the locus of free lines drawn on a screen.

In order to solve the problem, an electronic whiteboard system according to the invention projects image data of a computer unit onto the screen of an electronic whiteboard by using a projector, in that the electronic whiteboard comprises coordinate detection means for detecting a position on the screen operated with an electronic pen and communications means for transmitting coordinate information on the screen detected by the coordinate detection means to a computer unit, and that the computer unit comprises communications means for receiving coordinate information from the electronic whiteboard, projected position information setting means for setting projected position information of a PC screen image projected onto the screen of the electronic whiteboard by the projector, projected position information storage section for storing projected position information, desktop operation/drawing means for enabling operation on the PC screen image projected on the screen based on the coordinate information and the projected position information as well as storing the locus of free lines drawn on the PC screen image in correspondence with the base image of the PC screen, document information storage section for storing a pair of base image and free lines on a per page basis and storing a plurality of pages as document information, and document information regeneration means for displaying a base image on the window of a computer unit then free lines over the base image in the order the lines were drawn based on the document information stored in the document information storage section.

In this way, the electronic whiteboard system displays a base image on the window of a computer unit then free lines over the base image in the order the lines were drawn. Thus, it is possible to reproduce the locus of free lines drawn on the PC screen image projected onto the screen of the electronic whiteboard.

Further, according to the electronic whiteboard system of the invention, the coordinate detection means detects the position on the screen by using the time difference caused by infrared rays and an supersonic wave simultaneously issued from an electronic pen and received by a coordinate detection sensor provided in predetermined position to calculate the distance from the electronic pen to the coordinate detection sensor, thereby detecting the position on the screen. The electronic whiteboard system displays abase image on the window of a computer unit then free lines over the base image in the order the lines were drawn. Thus, it is possible to reproduce the locus of free lines drawn on the PC screen image projected onto the screen of the electronic whiteboard.

BRIEF DESCRIPTION OF THE DRAWINGS

FIG. 1 is a block diagram showing the feature of an electronic whiteboard system according to one embodiment of the invention;

FIG. 2 is a block diagram showing the feature of a PC of an electronic whiteboard system according to one embodiment of the invention;

DETAILED DESCRIPTION OF THE PREFERRED EMBODIMENTS

This embodiment of the invention will be described referring to FIGS. 1 through 9. The same members are given the same numerals throughout the figures, and repeated description is omitted.

Figure 3:
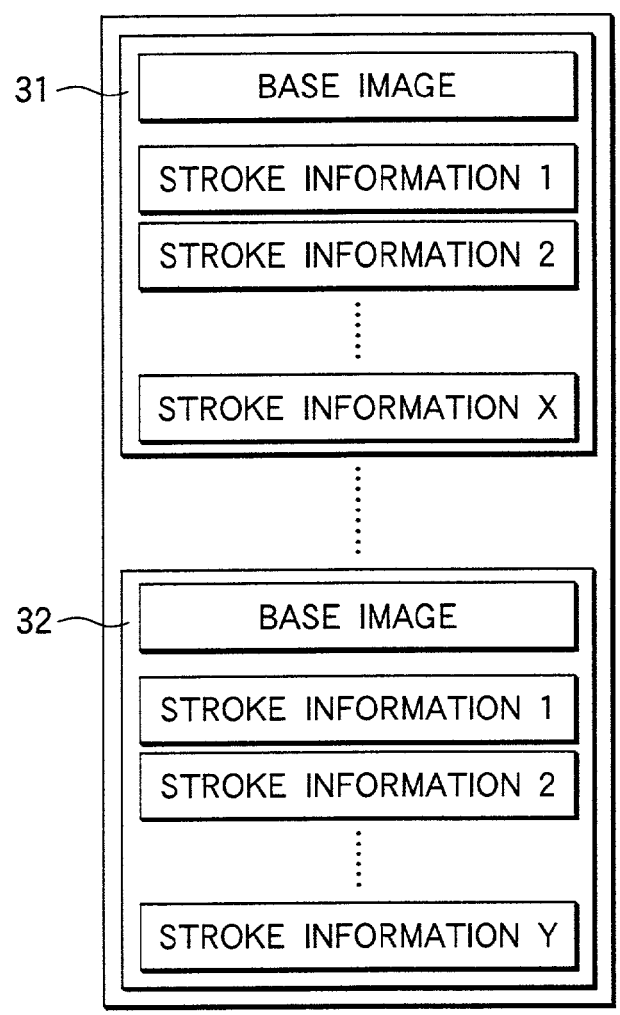
FIG. 3 is an explanatory drawing showing the configuration of a document information storage section in FIG. 2.
Figure 4:
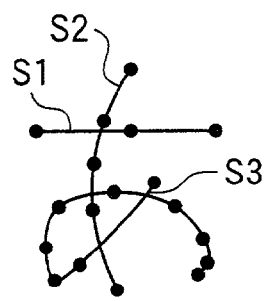
FIG. 4 is an explanatory drawing showing a specific example of a stroke according to one embodiment of the invention.
Figure 5:
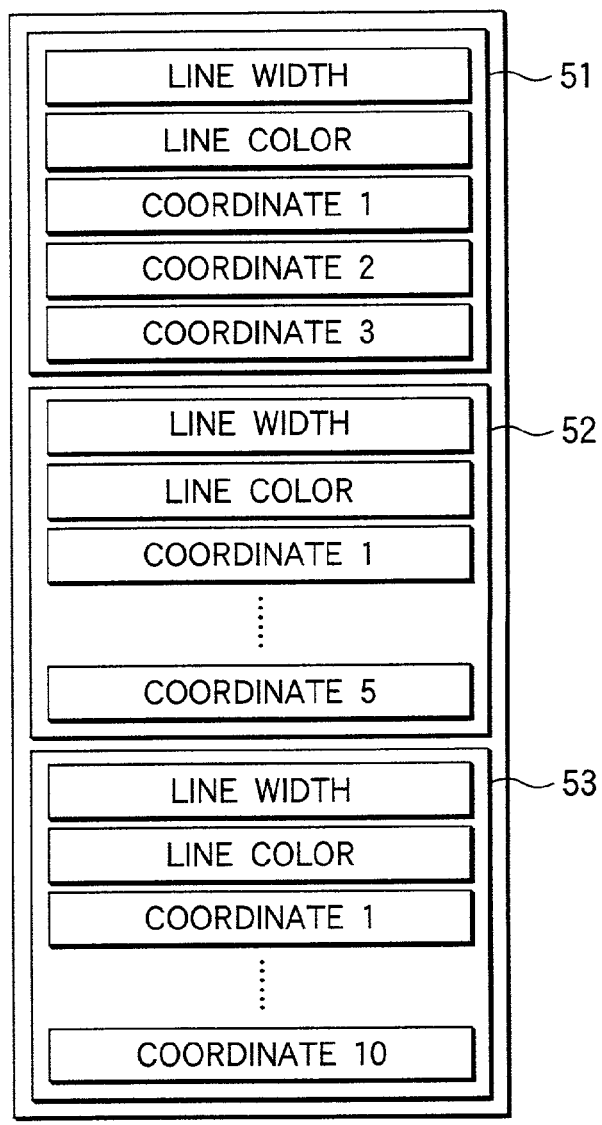
FIG. 5 is an explanatory drawing showing stroke information stored onto a PC.
Figure 6:
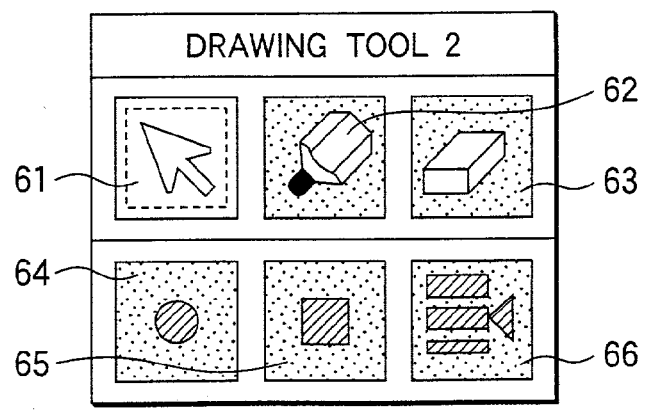
FIG. 6 is an explanatory drawing showing an example of desktop operation/drawing means according to one embodiment of the invention.
Figure 8:
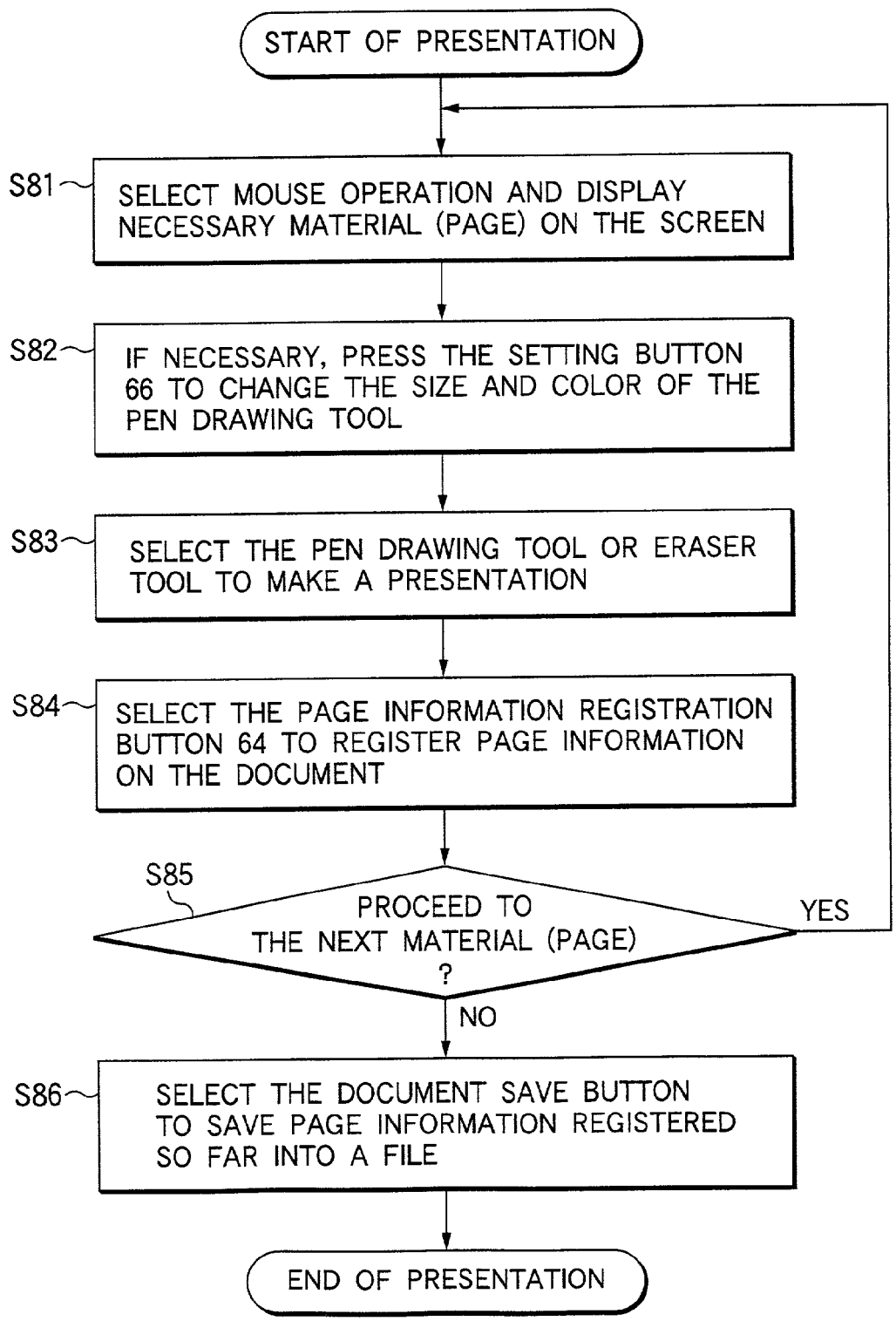
FIG. 8 is a flowchart showing the procedure of presentation using an electronic whiteboard system according to one embodiment of the invention.
Figure 9:
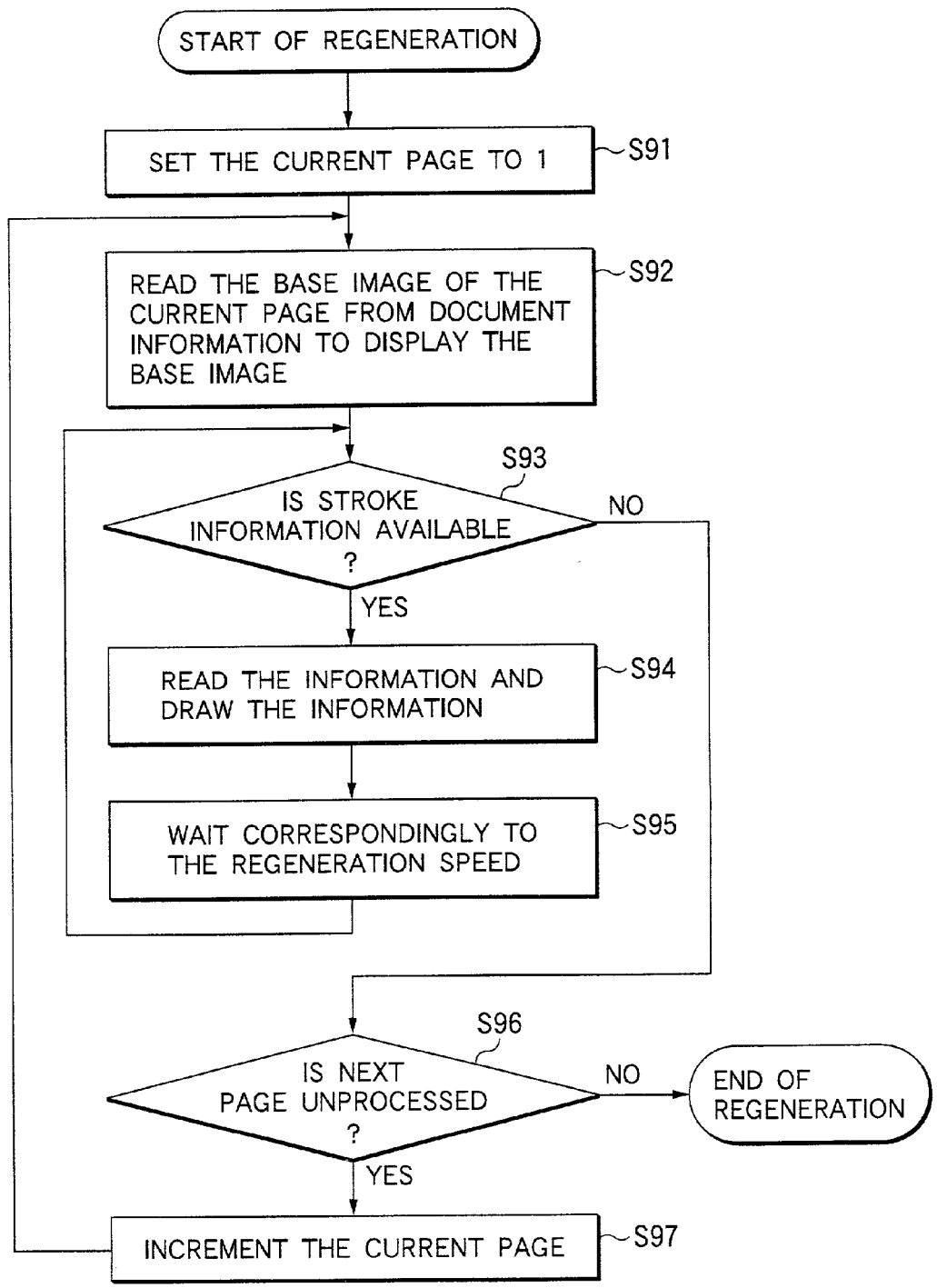
FIG. 9 is a flowchart showing the document information regeneration processing in an electronic whiteboard system according to one embodiment of the invention.

FIG. 1 is a block diagram showing the feature of an electronic whiteboard system according to one embodiment of the invention. FIG. 2 is a block diagram showing the feature of a PC of an electronic whiteboard system according to one embodiment of the invention. FIG. 3 is an explanatory drawing showing the configuration of a document information storage section in FIG. 2. FIG. 4 is an explanatory drawing showing a specific example of a stroke according to one embodiment of the invention. FIG. 5 is an explanatory drawing showing stroke information stored onto a PC. FIG. 6 is an explanatory drawing showing an example of desktop operation/drawing means according to one embodiment of the invention. FIG. 7 is an explanatory drawing showing an example of work on a PC screen image projected onto the screen of an electronic whiteboard system according to one embodiment of the invention. FIG. 8 is a flowchart showing the procedure of presentation using an electronic whiteboard system according to one embodiment of the invention. FIG. 9 is a flowchart showing the document information regeneration processing in an electronic whiteboard system according to one embodiment of the invention.

Figure 10:
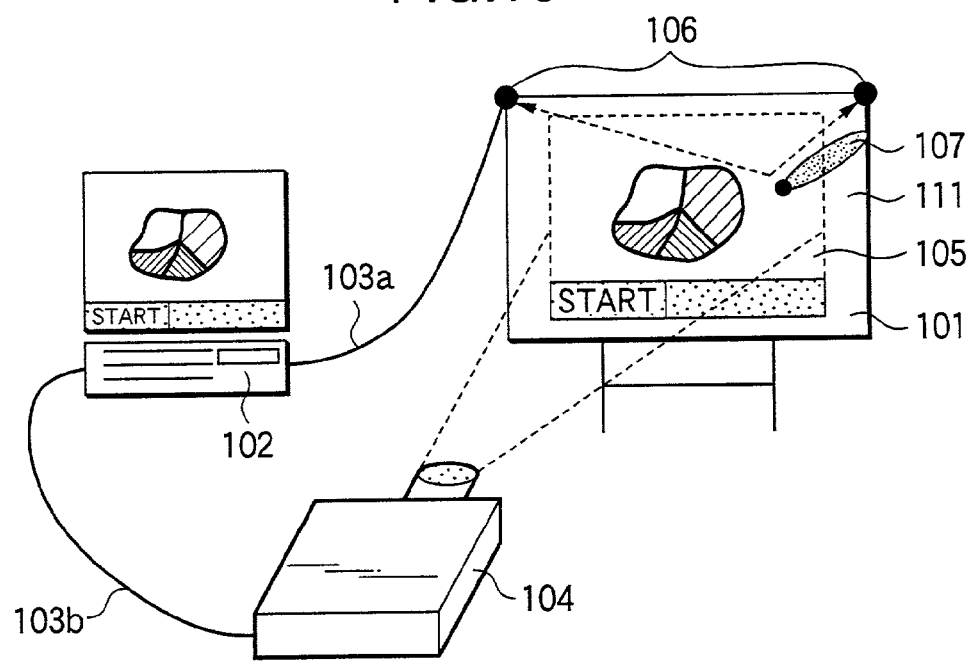
FIG. 10 shows a general configuration of a related art electronic whiteboard system.
Figure 11:
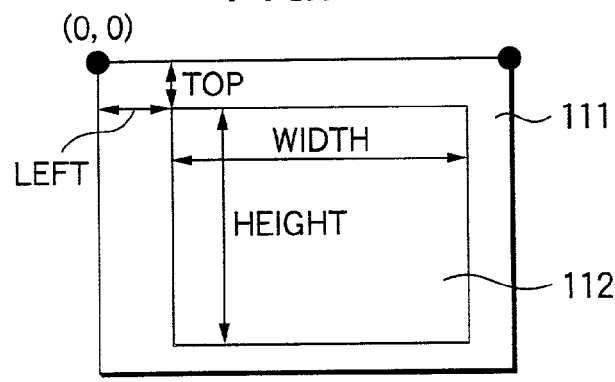
FIG. 11 is an explanatory drawing showing the projected position information in the electronic whiteboard system in FIG. 10.
Figure 12:
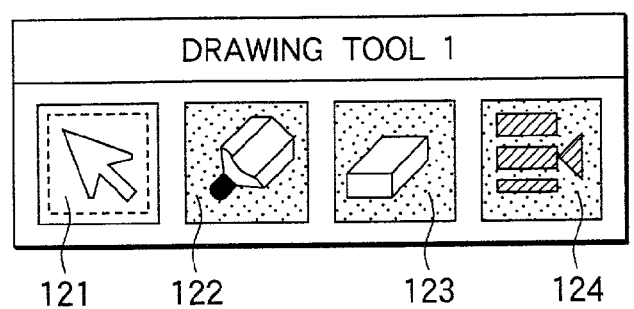
FIG. 12 an explanatory drawing showing a drawing tool of software on the PC in the electronic whiteboard system in FIG. 10.

The general configuration of an electronic whiteboard system according to this embodiment is approximately the same as that shown in FIG. 10 mentioned earlier. In the following description, FIG. 10 is also used as required.

An electronic whiteboard system according to this embodiment projects image data of a computer unit such as a personal computer (hereinafter referred to as PC) 102 (FIG. 10) onto the screen 111 of an electronic whiteboard 101 (FIG. 10) by a projector 104 (FIG. 10).

The electronic whiteboard, as shown in FIG. 1, comprises coordinate detection means 11 for detecting a coordinate position on the screen 111 operated with an electronic pen 107 (FIG. 10) in combination with a coordinate detection sensor 106 (FIG. 10), communications means 12 for reporting coordinate information on the screen 111 detected by the coordinate detection means 11 to the PC, and a controller 13 for performing operation control of the entire unit. In this embodiment, the coordinate detection means uses the time difference caused by infrared rays and an supersonic wave simultaneously issued from an electronic pen and received by a coordinate detection sensor 106 to calculate the distance from the electronic pen 107 to the coordinate detection sensor 106.

The PC comprises an input unit 21 such as a keyboard and a mouse, communication means 23 for performing data communications with an electronic whiteboard to receive coordinate information from then electronic whiteboard, projected position information setting means 24 for setting projected position information of the image of a PC screen 105 (FIG. 10) projected onto the screen, projected position information storage section 25 for storing projected position information set by the projected position information setting means 24, desktop operation/drawing means 26 for performing mouse operation with the electronic pen 107 and free line drawing on the PC screen 105, document information storage section 27 for storing a pair of base image and free lines of the PC screen 105 on a per page basis and storing a plurality of pages on a per document basis, document information regeneration means 28 for reproducing the drawing state onto the window of the PC based on the document information of the document information storage section, and a controller 29 for controlling the entire PC.

The desktop operation/drawing means 26 enables operation on using an electronic pen 107 on the PC screen image projected on the screen 111 based on the coordinate information and projected position information as well as stores the locus of free lines drawn on the image of the PC screen 105 in correspondence with the base image of the PC screen 105. The document information regeneration means 28 displays a base image on the window of a PC then free lines over the base image in the order the lines were drawn to reproduce the state of drawing on the screen.

Here, the document information storage section 27 manages an arbitrary number of pages of page-based information and comprises the page information on the first page 31 through page information on the nth page 32.

Page information is comprises a single page image and an arbitrary number of stroke information items. The base image is a screen image serving as a background for the page, over which all strokes are drawn. The stroke information has information for regenerating stroke-based drawing represented using an electronic pen 107 on an electronic whiteboard 101.

Here, the stroke information of the character "あ" will be described using FIGS. 4 and 5.

As shown in FIG. 4, "あ" comprises three strokes, S1, S2 and S3. As shown in FIG. 5, stroke information 51, 52, 53 is stored corresponding to theses strokes.

Individual stroke information comprises a line width, line color and more than one item of coordinate data. As shown by black dots in FIG. 4, the stroke S1 stores three points, stroke S2 five points, and stroke S3 10 points of coordinate data. Thus, by storing stroke information as shown in FIG. 5, it is possible to reproduce drawing of "あ" in FIG. 4 in an arbitrary two-dimensional space such as a display of a PC. In particular, coordinates where individual stroke information is stored are linked with lines from top to bottom by using each line width and line color. The lines may be straight lines or an approximate curve such as the Bézier curve as long as the drawing represented on the screen 111 with the electronic pen 107 is approximate to the reproduced drawing.

FIG. 6 shows a specific example of desktop operation/drawing means (hereinafter referred to as "drawing tool") for performing mouse operation of PC and free line drawing by way of an electronic pen 107.

The second drawing tool comprises a mouse operation tool 61 selected in mouse operation using the electronic pen 107, a pen drawing tool 62 selected in drawing free lines on the PC screen 105, an eraser tool 63 selected in erasing part or all of the free lines drawn with the pen drawing tool 62, a page information registration button 64 for storing base image and free line data on selection as page information, a document save button 65 for saving the page information stored on selection as document information, and a setting button 66 for displaying a dialog box to change the width, color of the pen drawing tool and the size of the eraser tool 63.

FIGS. 7A to 7D show examples of work on a PC screen image projected onto the screen of such an electronic whiteboard system.

In FIGS. 7A to 7D, the image of the PC screen 72 is projected onto the screen 71 of the electronic whiteboard. Coordinate detection sensors 73 for detecting a coordinate position as a write position of the electronic pen on the screen 71 are arranged in two upper corners of the screen 71. On the screen 71 is displayed the second drawing tool 74.

Figure 7A:
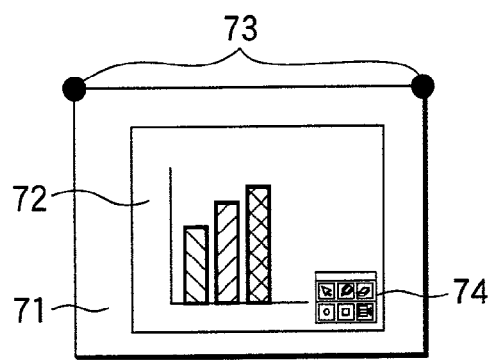
FIG. 7 is an explanatory drawing showing an example of work on a PC screen image projected on to the screen of an electronic whiteboard system according to one embodiment of the invention.
Figure 7B:
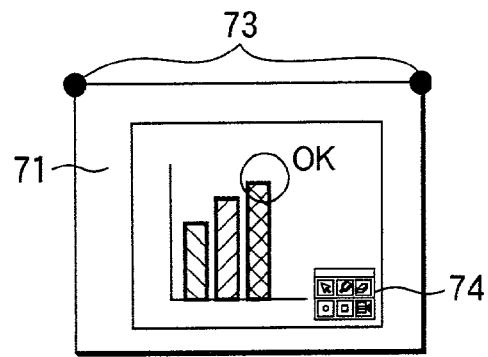
Figure 7C:
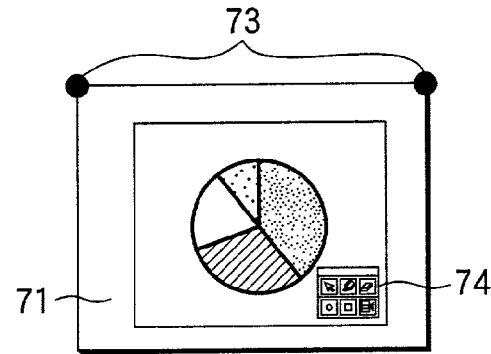
Figure 7D:
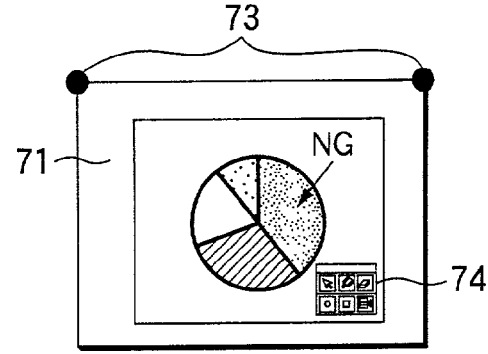

FIG. 7A is a base image on the first page. FIG. 7B shows a state a circle and "OK" are drawn with free lines using an electronic pen on the base image on the first page. FIG. 7C is a base image on the second page. FIG. 7D shows a state an arrow and "NG" are drawn with free lines using an electronic pen on the base image on the second page.

Processing flow in an electronic whiteboard system according to this embodiment will be described.

Procedure for presentation with the second drawing tool 74 by using the electronic whiteboard system according to this embodiment is shown in FIG. 8.

In this procedure, select the mouse operation tool 61 (S81) to display the first material (page) necessary for presentation. An electronic pen is used for this purpose.

Next, if necessary, press the setting button 66 to set the size and color of the pen drawing tool 62 (S82) and select the pen drawing tool 62 and enter comments with free lines to make a presentation (S83). Select the eraser tool 63 if wishing to erase the drawn free line. An example of the eraser tool 63 is erasure of free lines at a position operated with an electronic pen by way of a circle or rectangle of a certain size. The size can be set with the setting button 66.

On completion of the presentation on the first page, press the page information registration button 64 to register information on the base image and free lines (S84).

When pages continue (S85), select the mouse operation tool 61 again to return to the work of displaying a necessary material (page) (S81) to repeat work such as annotation and registration/correction of page information by using the pen drawing tool 62 and the eraser tool 63.

On completion of the presentation of the last material (page) (S85), press the document save button 65 to save all page information registered so far as document information (S86) This saves the process of the presentation.

FIG. 9 shows the processing of regenerating a document saved by the process of presentation shown in FIG. 8 in an electronic whiteboard system according to this embodiment.

First, display a window for regeneration and set the current page to 1 (S91), then read the base image of the current page from document information to display the base image on the window (S92).

In case the stroke information on the current page is available (S93), read the information and draw the information on the regeneration window (S94). After drawing a single item of stroke information, wait correspondingly to the regeneration speed before drawing the next stroke information (S95). Repeat this step until no strokes are left unprocessed. When all strokes are processed, regeneration of the page is complete.

In case the next page is unprocessed (S96), increment the current page (S97) and return to S92 to continue from display of current page. When no pages are left unprocessed, regeneration is complete.

In this way, the electronic whiteboard system according to this embodiment displays a base image on the window of a PC then free lines over the base image in the order the lines were drawn. Thus, it is possible to reproduce the locus of free lines drawn on the PC screen image projected onto the screen of the electronic whiteboard.

As mentioned earlier, the invention is advantageous in that the electronic whiteboard system according to the invention displays a base image on the window of a computer unit then free lines over the base image in the order the lines were drawn. Thus, it is possible to reproduce the locus of free lines drawn on the PC screen image projected onto the screen of the electronic whiteboard.

What is claimed is:

1. An electronic whiteboard system comprising a computer unit, an electronic whiteboard, and a projector which projects image data of the computer unit onto the screen of the electronic whiteboard, wherein said electronic whiteboard comprises:
  coordinate detection means for detecting and determining coordinate information of a position of an electronic pen on the screen; and
  communications means for reporting coordinate information on the screen detected by said coordinate detection means to a computer unit, and
said computer unit comprises:
  communications means for receiving said coordinate information from the electronic whiteboard;
  projected position information setting means for setting projected position information of a PC screen image projected onto the screen of the electronic whiteboard by the projector;
  projected position information storage section for storing said projected position information;
  desktop operation/drawing means for enabling operation including drawing free lines on the PC screen image projected on the screen based on said coordinate information and said projected position information as well as storing individual stroke information of each of the free lines drawn on the PC screen image in correspondence with a base image of the PC screen;
  document information storage section for storing a pair of said base image and said free lines on a per page basis and storing a plurality of pages as document information; and
  document information regeneration means for displaying said base image on a display of the computer unit and then sequentially displaying the stroke information of each of said free lines over said base image in the order said free lines were drawn based on the document information stored in the document information storage section.

2. An electronic whiteboard system comprising a computer unit, an electronic whiteboard, and a projector which projects image data of the computer unit onto the screen of the electronic whiteboard,
wherein said electronic whiteboard comprises:
  coordinate detection means for detecting a position of an electronic pen on the screen; and
  communications means for reporting coordinate information on the screen detected by said coordinate detection means to a computer unit, and
said computer unit comprises:
  communications means for receiving said coordinate information from the electronic whiteboard;
  projected position information setting means for setting projected position information of a PC screen image projected onto the screen of the electronic whiteboard by the projector;
  projected position information storage section for storing said projected position information;
  desktop operation/drawing means for enabling operation on the PC screen image projected on the screen based on said coordinate information and said projected position information as well as storing a locus of free lines drawn on the PC screen image in correspondence with a base image of the PC screen;
  document information storage section for storing a pair of said base image and said free lines on a per page basis and storing a plurality of pages as document information;
  document information regeneration means for displaying said base image on a display of the computer unit and said free lines over said base image in the order said free lines were drawn based on the document information stored in the document information storage section; and
  wherein coordinate detection means detects the position on the screen by using a time difference caused by infrared rays and an supersonic wave simultaneously issued from an electronic pen and received by a coordinate detection sensor provided in predetermined position to calculate the distance from the electronic pen to the coordinate detection sensor, thereby detecting the position on the screen.

3. An electronic whiteboard system comprising a computer unit, an electronic whiteboard, and a projector which projects image data of the computer unit onto the screen of the electronic whiteboard, said system comprising:
  a document information storage unit for dividing in time-order individual stroke information data of a drawing provided on the screen of the electronic whiteboard with an electronic pen, combining said time-order divided stroke information data and image data projected onto the screen of the electronic whiteboard by the projector, and storing the combined data as document information, and
  a document information regeneration unit for regenerating in time-order the document information stored in the document information storage unit by sequentially displaying said stored image data and time-order divided stroke information on at least one of the display screen of the computer unit and the screen of the electronic whiteboard.

4. An electronic whiteboard system according to claim 3, wherein said document information storage unit stores said document information by processing, as a single set, time-order divided stroke information and image projected onto the screen of the electronic whiteboard when a drawing corresponding to the stroke information is provided on the screen of the electronic whiteboard with an electronic pen.

5. An electronic whiteboard system according to claim 4, wherein said single set of document information comprises a plurality of said time-order divided stroke information.

6. A drawing regeneration method for an electronic whiteboard system which projects image data of a computer unit onto the screen of an electronic whiteboard by using a projector, the method comprising the steps of:
  time-order dividing individual stroke information data of a drawing provided on the screen of the electronic whiteboard with an electronic pen;
  combining said time-order divided stroke information data and image data projected onto the screen of the electronic whiteboard by the projector and storing said combined data as a plurality of document information items in a document information storage unit; and
  time-order regenerating said stored combined data by sequentially displaying said stored image data and time-order divided stroke information on at least one of a display screen of the computer unit and the screen of the electronic whiteboard, based on said plurality of document information items.

7. A drawing regeneration method for an electronic whiteboard system according to claim 6, wherein said storing step comprises a step of processing, as a single set, time-order divided stroke information and an image projected onto the screen of the electronic whiteboard when a drawing corresponding to the stroke information is provided on the screen of the electronic whiteboard with an electronic pen.

8. A drawing regeneration method for an electronic whiteboard system according to claim 7, wherein said single set of document information comprises a plurality of said time-order divided stroke information.

9. An electronic whiteboard system comprising a computer unit, an electronic whiteboard, and a projector which projects image data of the computer unit onto the screen of the electronic whiteboard,
   wherein said electronic whiteboard comprises:
      coordinate detection means for detecting and determining coordinate information of a position of an electronic pen on the screen, the coordinate detection means being provided on the screen; and
      communications means for reporting coordinate information on the screen detected by said coordinate detection means to a computer unit, and
   said computer unit comprises:
      communications means for receiving said coordinate information from the electronic whiteboard;
      projected position information setting means for setting projected position information of a PC screen image projected onto the screen of the electronic whiteboard by the projector;
      projected position information storage section for storing said projected position information;
      desktop operation/drawing means for enabling operation including drawing free lines on the PC screen image projected on the screen based on said coordinate information and said projected position information as well as storing individual stroke information of each of the free lines drawn on the PC screen image in correspondence with a base image of the PC screen;
      document information storage section for storing a pair of said base image and said free lines on a per page basis and storing a plurality of pages as document information; and
      document information regeneration means for displaying said base image on a display of the computer unit and said free lines over said base image in the order said free lines were drawn based on the document information stored in the document information storage section.

10. An electronic whiteboard system comprising a computer unit, an electronic whiteboard, and a projector which projects image data of the computer unit onto the screen of the electronic whiteboard,
   wherein said electronic whiteboard comprises:
      coordinate detection device for detecting a position of an electronic pen on the screen; and
      communications device for reporting coordinate information on the screen detected by said coordinate detection device to a computer unit, and
   said computer unit comprises:
      communications device for receiving said coordinate information from the electronic whiteboard;
      projected position information setting device for setting projected position information of a PC screen image projected onto the screen of the electronic whiteboard by the projector;
      projected position information storage section for storing said projected position information;
      desktop operation/drawing tool for enabling operation on the PC screen image projected on the screen based on said coordinate information and said projected position information as well as storing a locus of free lines drawn on the PC screen image in correspondence with a base image of the PC screen;
      document information storage section for storing a pair of said base image and said free lines on a per page basis and storing a plurality of pages as document information;
      document information regeneration device for displaying said base image on a display of the computer unit and said free lines over said base image in the order said free lines were drawn based on the document information stored in the document information storage section; and
   wherein coordinate detection device detects the position on the screen by using a time difference caused by infrared rays and an supersonic wave simultaneously issued from an electronic pen and received by a coordinate detection sensor provided in predetermined position to calculate the distance from the electronic pen to the coordinate detection sensor, thereby detecting the position on the screen.

11. An electronic whiteboard system according to claim 10, wherein the coordinate detection device is a coordinate detection sensor, and the communication device is a radio communication device.

* * * * *